(12) United States Patent　　(10) Patent No.:　　US 8,199,338 B2
Kim　　(45) Date of Patent:　　Jun. 12, 2012

(54) METHOD AND APPARATUS FOR DYNAMICALLY CHANGING SETTINGS FOR IMAGE FORMING APPARATUS

(75) Inventor: Do-Hyung Kim, Songpa-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1220 days.

(21) Appl. No.: 10/993,444

(22) Filed: Nov. 22, 2004

(65) Prior Publication Data

US 2005/0111028 A1　　May 26, 2005

(30) Foreign Application Priority Data

Nov. 24, 2003　(KR) .................. 10-2003-0083495

(51) Int. Cl.
　　*G06K 15/00*　　(2006.01)
　　*G06K 15/02*　　(2006.01)
　　*G06F 3/12*　　(2006.01)
(52) U.S. Cl. ...... 358/1.14; 358/1.2; 358/1.15; 358/1.16; 358/1.18
(58) Field of Classification Search .................. None
See application file for complete search history.

(56) References Cited

U.S. PATENT DOCUMENTS

| 4,667,248 | A  | * | 5/1987  | Kanno ........................... 358/452 |
| 5,752,049 | A  | * | 5/1998  | Lee ............................... 713/323 |
| 5,847,741 | A  | * | 12/1998 | Lee ............................... 347/153 |
| 6,078,404 | A  | * | 6/2000  | Natsume et al. ............... 358/1.2 |
| 6,172,761 | B1 | * | 1/2001  | Ohtani ........................... 358/1.12 |
| 6,213,652 | B1 | * | 4/2001  | Suzuki et al. ................. 358/1.15 |
| 6,351,317 | B1 | * | 2/2002  | Sasaki et al. ................. 358/1.15 |
| 6,496,278 | B1 | * | 12/2002 | Tamura et al. ............... 358/1.16 |
| 6,693,720 | B1 | * | 2/2004  | Livingston ................... 358/1.15 |
| 6,981,254 | B2 | * | 12/2005 | Parry .............................. 718/100 |
| 7,088,947 | B1 | * | 8/2006  | Dobbertin et al. ............ 399/382 |
| 7,158,244 | B2 | * | 1/2007  | Sommer et al. .............. 358/1.13 |
| 7,230,730 | B2 | * | 6/2007  | Owen et al. .................. 358/1.14 |
| 7,267,000 | B1 | * | 9/2007  | Usui et al. ................... 73/290 V |
| 2003/0156129 | A1 | * | 8/2003 | Takahashi et al. ............ 345/700 |
| 2004/0057073 | A1 | * | 3/2004 | Egawa et al. ................. 358/1.15 |

FOREIGN PATENT DOCUMENTS

| JP | 08-286895    | 11/1996 |
| JP | P11-212401   | 6/1999  |
| JP | P14-283673   | 3/2002  |
| KR | 1998-065466  | 10/1997 |
| KR | 1988-65466   | 10/1998 |

OTHER PUBLICATIONS

Korean Office Action dated Sep. 29, 2005.

\* cited by examiner

*Primary Examiner* — Vincent Rudolph
(74) *Attorney, Agent, or Firm* — Roylance, Abrams, Berdo & Goodman, L.L.P.

(57) ABSTRACT

Disclosed is a method and apparatus for controlling an image forming apparatus which allows the print setting to be changed. The method for controlling the print driving of an image forming apparatus comprises the steps of monitoring whether a stop signal is input while printing one or more images corresponding to input print data; stopping print driving of the image forming apparatus when the stop signal is detected; changing print setting of the image forming apparatus as demanded by a user; and printing one or more images, which correspond to the remaining print data unprinted due to the stoppage of the print driving, by applying the print setting changed. It is possible to change the print setting of the image forming apparatus desired by a user regardless of the print driving operation of the image forming apparatus and to reflect the changed print setting to the print driving.

18 Claims, 4 Drawing Sheets

METHOD AND APPARATUS FOR DYNAMICALLY CHANGING SETTINGS FOR IMAGE FORMING APPARATUS

CROSS-REFERENCE TO RELATED APPLICATIONS

This application claims the benefit under 35 U.S.C. §119(a) of Korean Patent Application No. 2003-83495, filed on Nov. 24, 2003, in the Korean Intellectual Property Office, the disclosure of which is incorporated herein by reference in its entirety.

BACKGROUND OF THE INVENTION

1. Field of the Invention

The present invention relates to an image forming apparatus. In particular the present invention relates to a method and apparatus for controlling an image forming apparatus, such as changing a print setting related to print quality, printing condition, and the like.

2. Description of the Related Art

An electrophotographic image forming apparatus, such as a printer, a copy machine, a facsimile machine and a multifunction machine, is an apparatus for printing an image corresponding to internally and externally input printing data on a print medium. Such an image forming apparatus is configured in such a way that a print setting related to print quality, condition of printing, or the like can be changed as the user desires. Print settings may also include the type of print medium, repetitive printing of a certain image, size of margin, size of image to be printed, and so on. The print setting is executed by operating an operating panel installed in the image forming apparatus or an external appliance, such as a computer connected to the image forming apparatus.

However, a conventional image forming apparatus as described above is not allowed to change print settings once the image printing is initiated, although it is possible to temporarily stop the print driving for providing a printing medium again, or to completely cancel the image printing. Accordingly, when it is required to change the print setting, a user has no choice but to completely cancel the image printing in progress, and then to re-execute the print settings. Therefore, with such a conventional image forming apparatus as described above, there is a problem in that when a precise printing operation is performed in which a user is required to inspect printed-out articles and to change the printing condition, the operating hours are increased and the operation is very troublesome due to restrictions in changing the print setting as described above.

Accordingly, there is a need for a method and apparatus that allows for print settings to be changed during the printing of image data.

SUMMARY OF THE INVENTION

Accordingly, embodiments of the present invention has been conceived to solve the above-mentioned problems occurring in the prior art and to provide other advantages. An object of the present invention is to provide a method and apparatus for controlling an image forming apparatus, which enables print settings of the image forming apparatus to be freely changed so that a user can readily acquire a desired printed-out article.

In order to achieve the above object, there is provided a method for controlling print driving of an image forming apparatus comprising the steps of: a) monitoring whether a stop signal is input while printing one or more images corresponding to input print data; b) stopping the print driving operation of the image forming apparatus when the stop signal is detected; c) changing a print setting of the image forming apparatus as demanded by a user; and d) printing one or more images, which correspond to the remaining print data unprinted due to the stoppage of the print driving, by applying the print setting changed in step c).

Accordingly, it is possible for the user to change the print settings of the image forming apparatus regardless of the print driving operations of the image forming apparatus and to render the changed print setting to be instantly reflected to the print driving.

According to an exemplary embodiment of the present invention, step b) further comprises the step of confirming whether a print cancel for the remaining print data is approved or not when the print driving operation is stopped; if the print cancel request is approved, the remaining print data is deleted. The print driving operation then waits until other print data is input, and if the print cancel request is rejected, whether to change the print setting or not is confirmed.

It is preferable that if changing the print setting request is approved, step c) is executed; and if changing the print setting is rejected, printing the images corresponding to the remaining print data is initiated by applying the previous print setting (prior to the input of the stop signal).

The print settings preferably comprise settings related to at least one of the number of times for printing a certain image, the type of print medium, the margin size of print medium, the shading of image to be printed on the print medium, and the size of image to be printed on the print medium.

In addition, the method preferably further comprises the step of storing the remaining print data when the print driving is stopped.

Step a) preferably further comprises the step of confirming whether a preferred stop signal is input prior to initiating the print driving operations.

In addition, if the preferred stop signal is input, preferably the print data input into the image forming apparatus is stored, it is then confirmed whether to change the print setting, and if changing the print setting is approved, then step c) and step d) are sequentially implemented.

Preferably, the stop signal is input and changing the print setting is executed by operating at least one of an operation control panel of the image forming apparatus and an external appliance connected to the image forming apparatus. It is further preferable that the image forming apparatus transmits information related to the state of progress of printing in the image forming apparatus to the external appliance in real time.

BRIEF DESCRIPTION OF THE DRAWINGS

The above and other objects, features and advantages of the embodiments of the present invention will be more apparent from the following detailed description taken with reference to the accompanying drawings, in which.

Throughout the drawings, like reference numerals refer to like features and structures.

DETAILED DESCRIPTION OF THE EXEMPLARY EMBODIMENTS

Hereinbelow, exemplary embodiments of the present invention will be described in detail with reference to the accompanying drawings.

Figure 1:
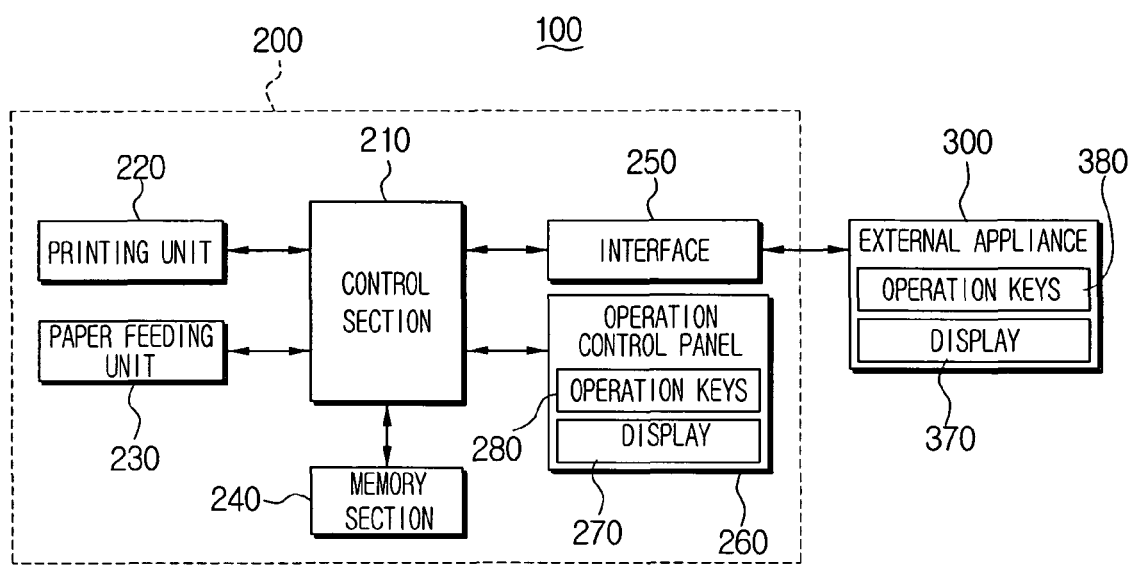
FIG. 1 is a block diagram showing an image forming system according to an embodiment of the present invention.

Referring to FIG. 1, the image forming system 100 according to an embodiment of the present invention comprises an image forming apparatus 200 connected with at least one external appliance 300, such as a computer, a Personal Digital Assistance (PDA), or the like, in such a way that the image forming apparatus can selectively exchange signals with the external appliance 300. The image forming apparatus 200 comprises a printing unit 220, a paper feeding unit 230 and a control section 210 for controlling the general driving operations of the image forming apparatus 200. The image forming apparatus 200 also comprises an operation control panel 260 provided with a plurality of operation keys 280, and a memory section 240 for storing one or more values of related print settings, among other things. Of course, the operation control panel 260 may further comprise a display 270, which is capable of displaying various information regarding the image forming apparatus 200. The image forming apparatus 200 may also be connected to several external appliances 300 through one or more interface 250 such as parallel ports or Universal Serial Bus (USB) ports. Beyond this, the image forming apparatus 200 may also be connected with a plurality of external appliances 300 through a network (not shown), in such a way that the image forming apparatus 200 can exchange signals with the external appliances 300. As described above, the external appliances 300 may individually comprise an operation key section 380 and a display 370, and a Remote Control Panel (RCP), which is a kind of remote control program, may be installed in such external appliances 300 so that the image forming apparatus 200 can be controlled remotely.

Hereinbelow, description will be made in terms of an embodiment of the inventive method for controlling an image forming apparatus constructed as described.

Figure 2:
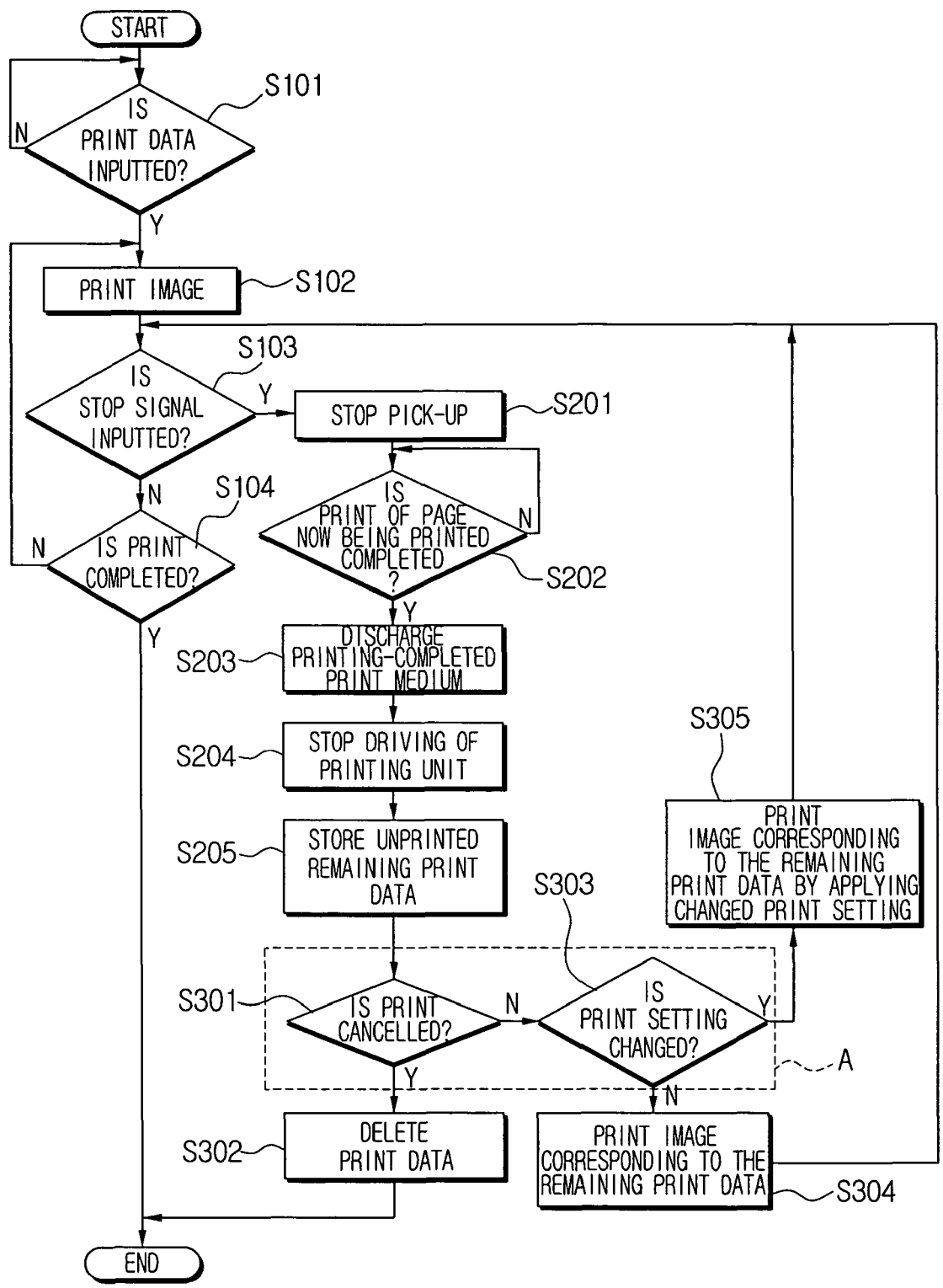
FIG. 2 is a flowchart showing a method for controlling the image forming apparatus according to an embodiment of the present invention.

FIG. 2 shows a method for controlling an image forming apparatus according to an embodiment of the present invention. Referring to FIG. 2, the method for controlling an image forming apparatus according to the embodiment of the present invention will now be described.

First, if print data is input into a control section by operating an image forming apparatus or an external appliance (S101), the control section drives a print unit and a paper-feeding unit, thereby initiating image printing (S102). In addition, the control section monitors whether a stop signal is input while an image is printed (S103). Such a stop signal can be input by operating one or more operation keys provided on an operation control panel of the image forming apparatus or in an external appliance. If a stop signal is not input until image printing corresponding to all of the input print data is completed (S104), the image forming apparatus stands by in the stopped state, in which the print driving operation of the print unit and the paper-feeding unit are stopped, until new print data is input into the control section.

Meanwhile, if a stop signal is input while the image printing is in progress, the control section controls the paper-feeding apparatus to temporarily stop new pick-up driving operations for a print medium (S201) and confirms whether a print medium is on the way to be printed or not, and if a print medium is to be printed, the control section stands by until the printing operation for that print medium is terminated (S202). If the printing operation is completed, the control section renders the print medium to be discharged out of the image printing apparatus (S203) and stops the print driving of the print unit (S204). If step S204 is completed, among the input print data, the control section stores the remaining print data unprinted into the memory section (S205), and the control section signals the image forming apparatus to enter a mode for changing the print setting A.

If the image forming apparatus enters the mode for changing the print setting A, the control section confirms whether the print cancel is approved or not (S301). Here, if the print cancel request is approved by a user, the control section deletes the remaining print data stored in step 205 (S302) and the control section signals the image forming apparatus to stand by until other print data is input.

Meanwhile, if the print cancel request is rejected in step 301, the control section confirms whether the changing the print setting request is approved or not (S303). If the change the print setting request is rejected, the control section controls the paper-feeding unit and the print unit, in such a way that one or more images corresponding to the remaining print data stored in step S205 are printed using the previous print setting prior to inputting the stop signal in step S103 (S304). Here, even if the image printing is initiated again as described above, the control section returns to S103 and monitors whether another stop signal is input. To the contrary, if a command for changing the print setting is detected in step S303 and then the print setting is changed, the control section controls the print unit and paper-feeding unit in such a way that the image corresponding to the remaining print data stored in step S205 will be printed when the print setting changed state in step S303 is applied (S305). In this case, the control section also has to return to step S103 while the image printing is in progress and monitors whether another stop signal is input.

Figure 3:
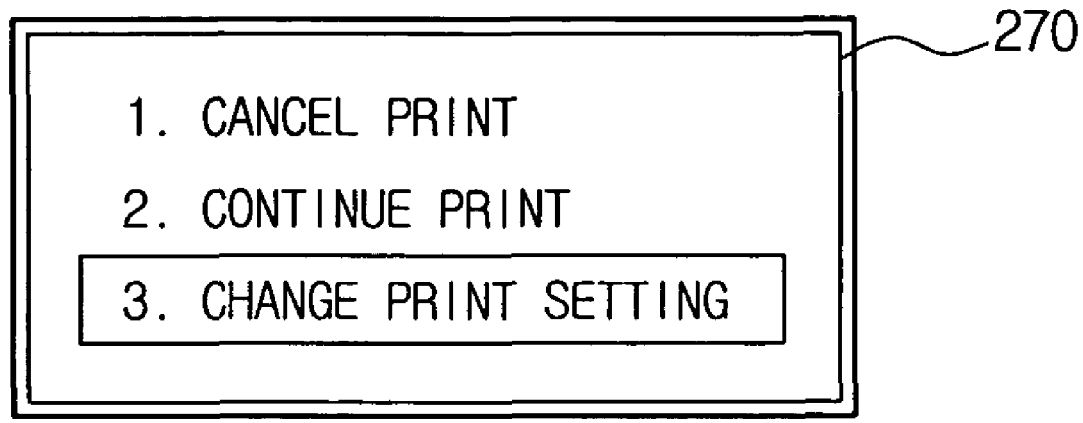
FIG. 3 shows an example of a frame displayed on a display at the time of changing print setting shown in FIG. 2.

The image forming apparatus described above can be configured in such a way that approval of the print cancel request, approval of changing print setting request, input of a value of a changed print setting, etc. can be executed by various methods at the mode of changing the print setting A. FIG. 3 shows a dialogue box 270 displayed on a display for helping a user to select items such as print cancel, continuation of print, changing print setting so as to input approval of print cancel request and approval of changing print setting requests, by way of an example.

According to embodiments of the inventive method for controlling an image forming apparatus as described above, the user can change the print setting even while the image printing apparatus is printing.

Meanwhile, in order that changing the print setting as described above can be implemented through an external appliance, it is requested that the user be able to precisely confirm which print data is now being printed among the print data input into the image forming apparatus through the external appliance. For this purpose, according to embodiments of the present invention, the image forming apparatus is adapted to instantly transmit the information regarding the print data as being now printed to the external appliance. Accordingly, the user is also allowed to control the image forming apparatus at real time through the external appliance.

Hereinbelow, a method for controlling an image forming apparatus according to an embodiment of the present invention will be described with reference to FIG. 4. For reference, the steps of the present embodiment identical to those of the previous embodiment and shown in FIG. 2 will be indicated using the same reference numerals as those of FIG. 2 and description thereof will be omitted.

Figure 4:
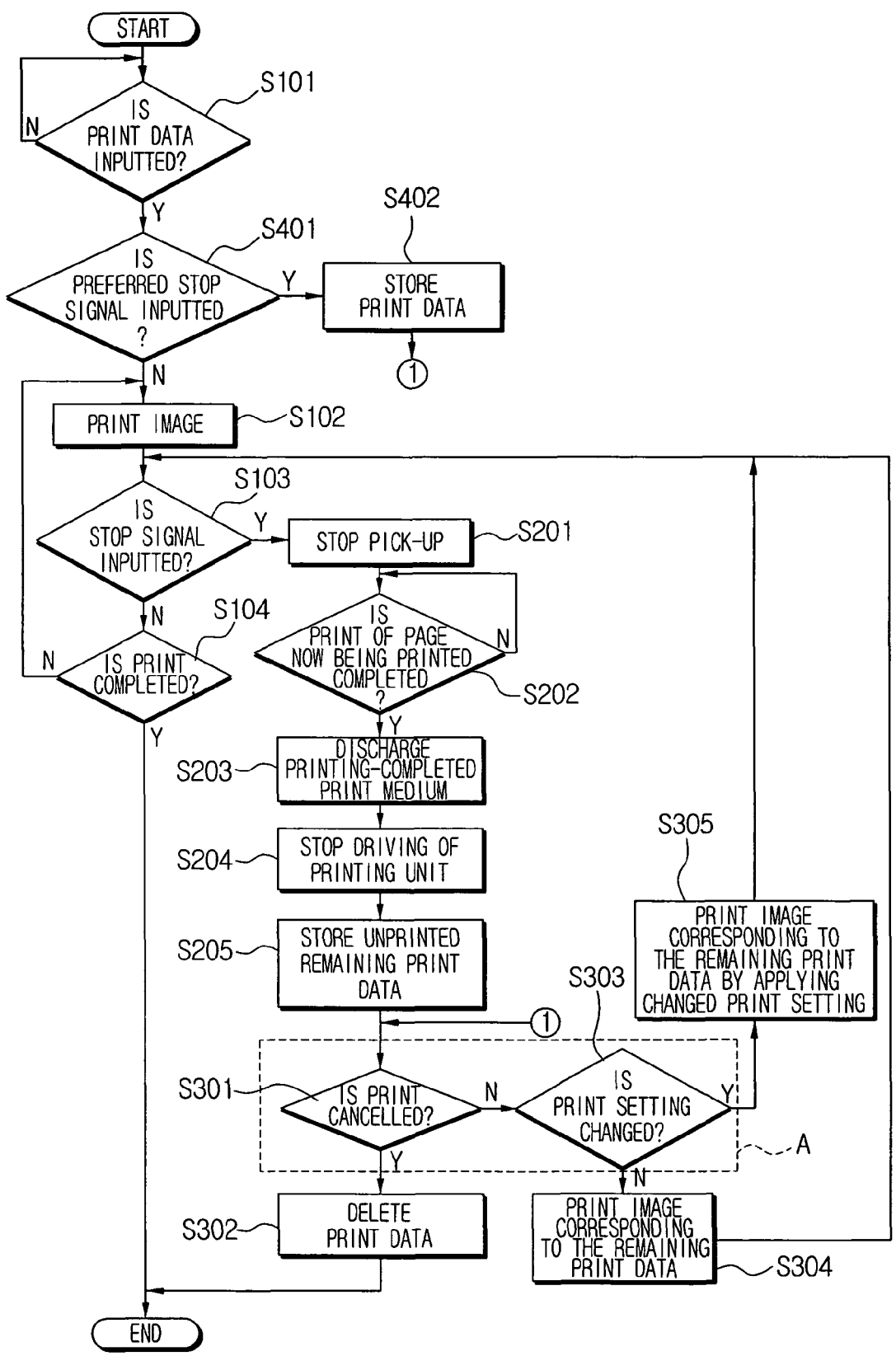
FIG. 4 is a flowchart showing a method for controlling an image forming apparatus according to an embodiment of the present invention.

Referring to FIG. 4, the inventive method for controlling an image forming apparatus comprises the step of confirming whether a preferred stop signal is input (S401) before printing is initiated (S102). If a preferred stop signal is not input in step S401, the process proceeds to step S102, and the subsequent printing process is executed in the same manner as that executed after step S102 in the previous embodiment. To the contrary, if it is determined that a preferred stop signal is input, the inputted print data is stored in the memory section (S402) and the process proceeds to step S301, and the subsequent printing process is executed in the same manner as that executed after step S301 in the previous embodiment.

A preferred stop signal described above can be input concurrently with inputting the print data or input prior to inputting the print data. Of course, such a preferred stop signal can be input by operating an image forming apparatus or an external appliance like the stop signal in the previous embodiment.

Such a preferred stop signal is input in order to render the print setting to be easily changed when the same image is repeatedly printed. If print data is input into a conventional image forming apparatus, it converts the inputted print data through a given conversion process, configures an image corresponding to the print data within the image forming apparatus in advance, and then prints the configured image onto one or more print mediums. Such print data cannot be reused once it is configured into a corresponding image. That is, if print data has been converted into an image, it is impossible to change the print setting while the image is being printed. According to the present embodiment, however, because a preferred stop signal can be inputted before image printing proceeds, it is possible to previously store the print data before the data is converted into an image. Therefore, it is possible to print an image corresponding to print data, to which the changed print setting is applied.

As described above, according to embodiments of the present invention, it is possible to change the print settings even while image printing is in progress. Accordingly, it is possible to change the print settings and to print an image to which the changed print setting is applied when the user desires to do so. Therefore, because the user can finely tune the print setting for each printed-out article while confirming the printed-out article, the user can easily acquire printed-out articles which are in accordance with the print quality and the print condition desired by the user.

Furthermore, if an image is printed with an undesired print setting due to the user's carelessness, it is possible to promptly change the print setting. Accordingly, waste of printing mediums and time required for printing operations can be avoided.

While the preferred embodiments of the present invention have been shown and described with reference to the representative embodiments thereof in order to exemplify the principle of the present invention, the present invention is not limited to the embodiments. It will be understood that various modifications and changes can be made by those skilled in the art without departing from the spirit and scope of the invention as defined by the appended claims. Therefore, it shall be considered that such modifications, changes and equivalents thereof are all included within the scope of the present invention.

What is claimed is:

1. A method for forming an image in an image forming apparatus comprising the steps of:
    (a) monitoring whether a stop signal is input while printing one or more images corresponding to inputted print data;
    (b) stopping print driving operations of the image forming apparatus when the stop signal is detected;
    (c) changing a print setting of the image forming apparatus as demanded by a user; and
    (d) printing one or more images, which correspond to the remaining print data unprinted due to the stoppage of the print driving operations, by applying the print setting changed in step (c);
    wherein the method further comprises the step of storing the remaining print data when the print driving operations are stopped;
    wherein the image forming apparatus comprises at least one of a printer, a copy machine, a facsimile machine and a multifunction machine;
    wherein the stoppage of the print driving operations occurs when at least one page has been printed as a result of the print driving operations; and
    wherein changing the print setting is to change a setting related to at least one of a repeated number of printings of a certain image, the type of print medium, the margin size of print medium, the shading of image to be printed on the print medium, and the size of the image to be printed on the print medium.

2. A method as claimed in claim 1, further comprising the step of confirming whether a print cancel request for the remaining print data is approved or not when the print driving operations are stopped.

3. A method as claimed in claim 2, wherein if the print cancel request is approved, the remaining print data is deleted, thereby stopping and then awaiting the print driving operations until other print data is inputted, and
    wherein if the print cancel request is rejected, whether to execute changing the print setting or not is confirmed.

4. A method as claimed in claim 3, wherein if a changing the print setting request is approved, step (c) is executed.

5. A method as claimed in claim 4, wherein if changing the print setting request is rejected, printing of the images corresponding to the remaining data is initiated by applying the previous print setting prior to input of the stop signal.

6. A method as claimed in claim 1, wherein inputting the stop signal and changing the print setting are executed by operating at least one of either an operation control panel of the image forming apparatus or an external appliance connected to the image forming apparatus; and
    wherein the image forming apparatus transmits information related to the state of the progress of printing in the image forming apparatus to the external appliance in real time.

7. A method for forming an image in an image forming apparatus comprising the steps of:
    (a) confirming whether a preferred stop signal is input or not at the time of inputting print data;
    (b) stopping print driving operations of the image forming apparatus when the preferred stop signal is detected;
    (c) changing a print setting of the image forming apparatus as demanded by a user; and
    (d) printing one or more images, which correspond to the print data, by applying the print setting changed in step (c);
    wherein the method further comprises the step of storing the print data input into the image forming apparatus when the preferred stop signal is detected;
    wherein the image forming apparatus comprises at least one of a printer, a copy machine, a facsimile machine and a multifunction machine;

wherein the stoppage of the print driving operations occurs when at least one page has been printed as a result of the print driving operations; and wherein changing the print setting is to change a setting related to at least one of a repeated number of printings of a certain image, the type of print medium, the margin size of print medium, the shading of image to be printed on the print medium, and the size of the image to be printed on the print medium.

8. A method as claimed in claim 7, further comprising the step of confirming whether a print cancel request is approved or not when the preferred stop signal is detected.

9. A method as claimed in claim 8, wherein if the print cancel request is approved, the remaining print data is deleted, thereby stopping the print driving and then awaiting the print driving until other print data is input, and wherein if the print cancel request is rejected, whether to execute changing the print setting or not is confirmed.

10. A method as claimed in claim 9, wherein if changing the print setting is approved, step (c) is executed; and wherein if changing the print setting is rejected, the images corresponding to the remaining data are printed out according to the previous print setting prior to inputting the stop signal.

11. A method as claimed in claim 7, wherein if the preferred stop signal is not detected in step (a), one or more images corresponding to the print data are printed, input of a stop signal is monitored, the print driving operations of the image forming apparatus are stopped when the stop signal is detected, the print setting of the image forming apparatus is changed as demanded by the user, and then one or more images corresponding to the remaining print data unprinted due to the stoppage of the print driving operations are printed by applying the changed print setting.

12. A method as claimed in claim 11, further comprising the step of confirming whether a print cancel request for the remaining print data is approved or not when the print driving is stopped.

13. A method as claimed in claim 12, wherein if the print cancel is approved, the remaining print data is deleted, thereby stopping and then awaiting the print driving until other print data is input, and wherein if the print cancel request is rejected, whether to execute changing the print setting or not is confirmed.

14. A method as claimed in claim 13, wherein if changing the print setting is approved, step (c) is executed; and wherein if changing the print setting is rejected, the printing of the images corresponding to the remaining data is initiated by applying the previous print setting prior to input of the stop signal.

15. A method as claimed in claim 11, further comprising the step of storing the remaining print data when the print driving operations are stopped.

16. A method as claimed in claim 7, wherein the image forming apparatus transmits information related to the state of progress of the printing in the image forming apparatus to the external appliance in real time.

17. An image forming apparatus comprising:

a control section for monitoring whether a stop signal is input while printing one or more images corresponding to inputted print data, wherein said control section stops print driving operations of said image forming apparatus when said stop signal is detected;

an operation control panel for changing at least one print setting of said image forming apparatus; and wherein said control section sends signals for printing one or more images, which correspond to remaining print data unprinted due to the stoppage of the print driving operations, by applying the print setting changed in response to an input from the operation control panel changing said at least one print setting;

wherein said apparatus further comprises a memory for storing said remaining print data when the print driving operations are stopped;

wherein the image forming apparatus comprises at least one of a printer, a copy machine, a facsimile machine and a multifunction machine;

wherein the stoppage of the print driving operations occurs when at least one page has been printed as a result of the print driving operations; and wherein changing the print setting is to change a setting related to at least one of a repeated number of printings of a certain image, the type of print medium, the margin size of print medium, the shading of image to be printed on the print medium, and the size of the image to be printed on the print medium.

18. An apparatus as claimed in claim 17, wherein said control section confirms whether a print cancel request for said remaining print data is approved or not when said print driving operations are stopped.

* * * * *